United States Patent [19]

Hamada et al.

[11] 4,366,278

[45] Dec. 28, 1982

[54] FLAME RETARDANT SILICONE RUBBER COMPOSITIONS CONTAINING CARBOXAMIDES

[75] Inventors: Mitsuo Hamada, Kisarazu; Sadami Yasuda, Ichihara, both of Japan

[73] Assignee: Toray Silicone Co., Ltd., Tokyo, Japan

[21] Appl. No.: 245,781

[22] Filed: Mar. 20, 1981

[30] Foreign Application Priority Data

Mar. 28, 1980 [JP] Japan .................. 55-40948

[51] Int. Cl.$^3$ ............................................. C08L 83/04
[52] U.S. Cl. ................................ 524/210; 524/219; 524/233; 524/403
[58] Field of Search ............ 260/37 SB; 524/403, 524/233, 219, 210

[56] References Cited

U.S. PATENT DOCUMENTS

| | | | |
|---|---|---|---|
| 3,514,424 | 5/1970 | Noble et al. | 260/37 |
| 3,635,874 | 1/1972 | Laur et al. | 60/37 SB |
| 3,652,488 | 3/1972 | Harder | 260/37 SB |
| 3,821,140 | 6/1974 | Milbert | 260/37 SB |
| 3,862,081 | 1/1975 | Itoh et al. | 260/37 SB |
| 3,936,476 | 2/1976 | Itoh et al. | 260/37 SB |
| 3,996,184 | 12/1976 | Klosowski | 260/37 SB |
| 3,996,188 | 12/1976 | Laur | 260/37 SB |
| 4,156,674 | 5/1979 | Sumimura | 260/37 SB |
| 4,248,768 | 2/1981 | Fraleigh et al. | 260/37 SB |

FOREIGN PATENT DOCUMENTS 51-97644 10/1976 Japan .

*Primary Examiner*—Lewis T. Jacobs
*Attorney, Agent, or Firm*—Roger H. Borrousch

[57] ABSTRACT

A flame retardant silicone rubber with improved flame retardant properties and colorability can be obtained from a polydiorganosiloxane, a silica filler, a carboxamide, a platinum, an organic peroxide, and optionally cerium oxide or cerium hydroxide.

22 Claims, No Drawings

FLAME RETARDANT SILICONE RUBBER COMPOSITIONS CONTAINING CARBOXAMIDES

BACKGROUND OF THE INVENTION

1. Field of the Invention

This invention relates to a composition which cures to an improved flame retardant silicone rubber and to methods for making such a composition and rubber.

2. Description of the Prior Art

Silicone elastomers have various superior properties, but they suffer the drawback of being flammable and various methods have been proposed for making them nonflammable. As a representative example of these methods, a method is known from Noble et al. In U.S. Pat. No. 3,514,424, issued May 26, 1970, in which a platinum-containing material is combined with a silicone rubber compound. However, since a platinum-containing material alone does not impart sufficient flame self-extinguishability, many studies have been conducted on improving the flame extinguishability by combining the platinum-containing material with other compounds. For example, Laur et al. in U.S. Pat. No. 3,635,874, issued Jan. 18, 1972, teach a combination of a silicone rubber composition containing a platinum compound and fumed titanium dioxide. Itoh et al. in U.S. Pat. No. 3,936,476, issued Feb. 3, 1976, teach a combination of a silicone rubber composition containing a platinum compound and powdered manganese carbonate; and Hatanaka et al. in Japanese Patent Publication No. Sho 51(1976)-35501, published Oct. 2, 1976, teach a combination of a silicone rubber composition containing a platinum compound and $(FeO)_x(Fe_2O_3)_y$ where the ratio of x to y in the formula is 0.05/1 to 1.0/1; Harder in U.S. Pat. No. 3,652,488, issued Mar. 28, 1972 teaches a silicone rubber composition containing carbon black and a platinum compound; and Laur in U.S. Pat. No. 3,996,188, Dec. 7, 1976, teaches a silicone rubber composition which contains an alcohol producing organic peroxide, platinum, an aromatic acid, and an additive selected from titanium dioxide, carbon black, Group II metal oxides, rare earth metal oxides, and rare earth metal hydroxides.

However, those known methods do not produce a satisfactory flame self-extinguishability. The combination with a platinum compound and fumed titanium dioxide degrades the electrical properties of the silicone elastomer due to moisture. The combination with a platinum compound and manganese carbonate interferes with vulcanization and prevents sufficient vulcanization when an acyl organic peroxide is used as the vulcanizing agent. The combination with a platinum compound and $(FeO)_x(Fe_2O_3)_y$ shows a rather weak flame self-extinguishing effect unless the amount of addition is large. However, when the amount of $(FeO)_x(Fe_2O_3)_y$ is increased, the mechanical properties of the silicone elastomer deteriorate and, furthermore, it causes a reddish brown to brownsih black coloring of the elastomer to the extent that the elastomer becomes impossible to change to another desirable color.

SUMMARY OF THE INVENTION

The present invention provides a flame retardant silicone rubber composition which diminishes the drawbacks described above. Using a combination of platinum, carboxamide, and optionally cerium oxide or cerium hydroxide in a silicone rubber composition, the mechanical properties and the heat resistance are not impaired, as has occurred by using other known additives to enhance flame retardant properties. The compositions of this invention also exhibit superior colorability. Because the carboxamide is almost colorless and translucent, the compositions are translucent and almost colorless. Therefore, these compositions can be easily pigmented to a variety of colors.

DESCRIPTION OF THE INVENTION

This invention relates to a flame retardant silicone rubber composition comprising (A) 100 parts by weight of a polydiorganosiloxane of the average unit formula

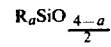

in which each R is a monovalent radical selected from the group consisting of hydrocarbon radicals and halogenated hydrocarbon radicals and a has a value of from 1.95 to 2.05 inclusive, (B) 0 to 150 parts by weight of a fine particle silica filler, (C) 1 to 200 ppm by weight of platinum based on the weight of (A), in the form of platinum or a platinum-containing compound, (D) 0.01 to 5 parts by weight of a carboxamide being formed from an acid selected from a monobasic acid, a multibasic acid, and a hydroxycarboxylic acid which is selected from carbonic acid, formic acid, aliphatic carboxylic acids, and aromatic carboxylic acids; which carboxamide is an amide which is a primary amide, a secondary amide, or a tertiary amide in which the amide contains alkyl, aryl, or hydrogen atoms bonded to nitrogen, and (E) 0.1 to 5 parts by weight of an organic peroxide.

The polydiorganosiloxane used as component (A) in the present invention is principally a linear polymer with an average unit formula

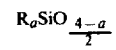

where each R is a monovalent hydrocarbon radical chosen from among methyl, ethyl, propyl, phenyl, vinyl, allyl, 2-phenylethyl, 1-phenylethyl, and their halogen-substituted derivatives, such as 3,3,3-trifluoropropyl and 3-chloropropyl, and a has a value of 1.95 to 2.05. Practical examples of the units constituting the polydiorganosiloxane include dimethylsiloxane, methylphenylsiloxane, diphenylsiloxane, methylvinylsiloxane, and phenylvinylsiloxane. High molecular weight polydiorganosiloxane known as gums are preferred, but this invention is not limited to only these. Component (A) can be a liquid at room temperature. Component (A) can be a homopolymer, copolymer, or mixture of these.

Also, a small amount of $RSiO_{1.5}$ units can be included in the polydiorganosiloxane. The polymer endblocking groups can be hydroxyl, alkoxy, trimethylsilyl, dimethylvinylsilyl, methyldiphenylsilyl, or methylphenylvinylsilyl.

Component (B) in the present invention is a fine particle silica filler including those conventionally used in silicone elastomers such as, fumed silica, precipitated silica, powdered quartz, and diatomaceous earth. Component (B) includes both reinforcing silica fillers and extending silica fillers. Preferably, the silica is pulverized to diameters smaller than 50 microns and specific surface areas larger than 100 m²/g. The surface can be untreated or it can be treated with organosilicon compounds such as organosilanes, organosiloxanes, or organosilazanes. When too much component (B) is added, the workability is reduced and the mechanical properties of the silicone elastomer obtained after vulcanization are degraded. Thus, the amount of silica filler is preferably limited to from 0–150 parts by weight based on 100 parts by weight of component (A).

Component (C) used in the present invention is 1 to 200 ppm and preferably 5 to 100 ppm of platinum based on the weight of component (A) as platinum or in a platinum-containing compound. Component (C) is required to impart flame retardancy to the silicone elastomer. The platinum can be in powdered form per se or it can be carried on a support, such as, alumina, silica gel, or asbestos. Examples of platinum compounds include chloroplatinic acid or complex compounds between chloroplatinic acid and alcohols, ethers, aldehydes, or siloxanes. It is important to disperse these platinum or platinum compounds uniformly in the silicone rubber composition to impart flame retardancy to the silicone elastomer after vulcanization. For this reason, component (B) can be used after dissolving or dispersing it in organic solvents such as isopropanol, ethanol, benzene, toluene, and xylene or in an organopolysiloxane oil.

Component (D), a carboxamide, used in the present invention is an important component for imparting flame retardancy to the silicone elastomer through synergistic interaction with component (C) described above. The carboxamides include three main groups, primary, secondary, and teritary amides. The hydrogen atom bonded to nitrogen in primary and secondary amides can be replaced by alkyl or aryl groups. The carboxylic acid from which the carboxamide is formed can be carbonic acid, formic acid, aliphatic carboxylic acids, and aromatic carboxylic acids. The carboxylic acids can be monobasic or multibasic acids or hydroxycarboxylic acids. However, they should not contain sulfur or phosphorus atoms.

Examples of the carboxamides include formamide, urea, N-methylformamide, N,N-dimethylformamide, acetamide, N-methylacetamide, N,N-diethylacetamide, propionamide, butyramide, benzamide, phenacetamide, nicotinamide, N-methylbenzamide, oxalamide, malonamide, succinamide, adipamide, phthalamide, o-acetamidobenzoic acid, acetanilide, hydroxyacetamide and 11-acetamidostearic acid.

The carboxamide can be added directly to components (A) and (B) or, when its melting point is high, it can be added after dissolving it in a solvent such as ethanol, etc. When too little component (D) is added, the flame retardancy of the silicone rubber deteriorates while when too much is added the moldability and vulcanization efficiency decline. The quantity of carboxamide is from 0.01 to 5 parts by weight per 100 parts by weight of (A), preferably from 0.1 to 5 parts by weight. An individual carboxamide or mixtures of more than one type can be added.

Component (E), an organic peroxide, is a curing agent for the present composition and examples include benzoyl peroxide, 2,4-dichlorobenzoyl peroxide, 2,5-bis-(t-butylperoxy)-2,5-dimethylhexane, dicumyl peroxide, monochlorobenzoyl peroxide, and t-butylperbenzoate. These are chosen to be appropriate for the application. The quantity of organic peroxide is from 0.1 to 5 parts by weight per 100 parts by weight of component (A).

Component (F), cerium oxide and cerium hydroxide, further improves the flame retardancy of silicone rubber compositions consisting of components (A)–(E) and it increases the flame retardancy synergistically by interacting with component (C), the platinum or platinum compound, and component (D), the carboxamide. Either cerous oxide ($Ce_2O_3$) or ceric oxide ($CeO_2$) can be used as the cerium oxide. As the cerium hydroxide, both cerous hydroxide and ceric hydroxide can be used and the latter can be either the monohydroxide, 1.5 hydroxide, or dihydroxide. It is preferable that both the cerium oxide and cerium hydroxide be powders. When its amount is smaller than 0.1 part by weight, the effect of improving the flame retardancy becomes rather poor. When the quantity of addition exceeds 10 parts by weight, there is no further significant increase in flame retardancy. Thus, the appropriate quantity of component (F) is 0.1 to 10 parts by weight per 100 parts by weight of (A).

The flame retardant silicone rubber of the present invention can include, in addition to components (A)–(E) or (A)–(F) described above, a processing aid such as alkoxysilanes, diphenylsilanediol, and low molecular weight organosiloxanes possessing terminal hydroxyl groups, such as polydimethylsiloxane.

The present composition can also be combined, as required, with bulking agents, such as, talc, mica, calcium carbonate, calcium zirconate, and zirconium silicate; flame retarding agents, such as, the cobalt salts of organic acids, azo compounds, triazole compounds, essentially sulfur-free carbon black, fumed titanium dioxide, metal carbonates, and $\gamma$-$Fe_2O_3$; pigments, such as, titanium dioxide and iron oxide; heat resistance agents such as cerium octylate and iron oxide; and oxidation inhibitors.

A preferred embodiment are those compositions which comprise 100 parts by weight of a polydiorganosiloxane gum, from 10 to 80 parts by weight of a fumed silica filler, from 1 to 200 parts by weight of platinum per 1,000,000 parts by weight of gum or a platinum compound in an amount sufficient to provide from 1 to 200 parts by weight platinum per 1,000,000 parts by weight of gum, from 0.1 to 5 parts by weight of carboxamide, and from 0.1 to 5 parts by weight of an acyl peroxide. These compositions can also contain 0.1 to 10 parts by weight of component (F) per 100 parts by weight of gum, especially ceric hydroxide.

The compositions of this invention can be prepared by mixing the components in a conventional rubber mixer, such as a rubber mill or dough mixer. Preferably, the compositions are prepared by mixing (A) and (B), optionally a processing aid, then heating the mixture to a temperature of 50° to 250° C. for at least 10 minutes, such as 10 minutes to 10 hours, cooling the mixture, and then admixing (C), (D), (E), and optionally (F). The cooling step should reduce the mixture's temperature such that the addition of the organic peroxide will not result in vulcanization during the mixing process. The temperature of the mixture should be below the activation temperature of the organic peroxide.

After being mixed uniformly, these compositions are vulcanized by heating to 100°–450° C. for several seconds to 1 hour under increased or normal pressure. When desirable, the vulcanized products can be further heated (post-curing) at 200°–250° C. for 1 to 48 hours to obtain an excellent flame retardant silicone rubber product.

The present invention will be explained further by the examples. In these examples, "part" represents "part by weight."

The flame retardancy was measured according to UL 758. A central wire structure consists of 7 lines of 0.26 mm each and the resulting outside diameter after coating with silicone rubber is 3.2 mm. Electric wire covered with the silicone rubber obtained after curing was cut into lengths of about 350 mm to serve as test samples and each sample was hung vertically under conditions of no air movement. The lower end of this sample was placed in the upper part of the interior flame of a Bunsen burner set at an angle of 20° against the sample (flame diameter 11 mm, interior flame 38 mm high and exterior flame 127 mm high) for 15 seconds. The Bunsen burner was then removed and the time in seconds was measured until the flame on the sample was extinguished. This test was carried out twice for each of 10 test samples and then the average (in seconds) of the total of 20 tests was calculated to represent the flame retardancy. When 270 mm or more of the sample burned, this was recorded as more than 60 seconds.

EXAMPLE 1

100 parts of a dimethylvinylsilyl endblocked polydiorganosiloxane gum having a degree of polymerization of about 3,000 and consisting of 99.8 mol % dimethylsiloxane units and 0.2 mol % methylvinylsiloxane units, 5 parts of a hydroxyl endblocked polydimethylsiloxane having a degree of polymerization of 10, 3 parts of diphenylsilanediol, and 50 parts of a fumed silica filler with a specific surface area of 200 m²/g were kneaded uniformly and the mixture was then heat treated at 150° C. for 2 hours to obtain a base compound. The base compound was cooled and then to 100 parts of this base compound there was added 1.0 part of 2,4-dichlorobenzoyl peroxide, 0.17 part of a 2 weight percent isopropanol solution of chloroplatinic acid hexahydrate and 1.0 part of N,N-dimethylformamide. After thoroughly mixing on a 2-roll mill, the electrical wire was coated using a 2 inch extruder. The resulting wire was then vulcanized at 400° C. for 15 seconds under normal pressure to obtain an electrical wire with an outside diameter of 3.2 mm. This was tested for flame retardancy under the conditions described earlier. The results are summarized in Table I. As can be seen in Table I, chloroplatinic acid alone or N,N-dimethylformamide alone did not provide satisfactory flame retardancy. When chloroplatinic acid and N,N-dimethylformamide were combined, the flame retardancy was significantly improved.

TABLE I

| | This invention | Comparative example | |
|---|---|---|---|
| | 1 | 2 | 3 |
| Base compound, parts | 100 | 100 | 100 |
| 2% isopropopanol solution of H₂PtCl₆.6H₂O, parts | 0.17 | 0.17 | — |
| N,N—dimethylformamide, parts | 1 | — | 1 |
| Flame retardancy, seconds | 30 | More than 60 | More than 60 |

EXAMPLE 2

Using the same base compound as in Example 1 while replacing the N,N-dimethylformamide with N,N-dimethylacetamide or 11-acetamidostearic acid and adding cerium hydroxide to improve the flame retardancy, a silicone rubber coated electrical wire was prepared under the same conditions as in Example 1. This wire was then tested for flame retardancy and the results are shown in Table II.

Both N,N-dimethylacetamide and 11-acetamidostearic acid showed superior flame retardancy when combined with chloroplatinic acid.

TABLE II

| | This invention | | | Comparative example | | |
|---|---|---|---|---|---|---|
| Composition No. | 4 | 5 | 6 | 7 | 8 | 9 |
| Base compound, parts | 100 | 100 | 100 | 100 | 100 | 100 |
| H₂PtCl₆.6H₂O 2% isopropanol solution, parts | 0.17 | 0.17 | 0.17 | 0.17 | — | — |
| Ceric hydroxide, parts | — | 1.2 | 1.2 | 1.2 | 1.2 | 1.2 |
| N,N—dimethylformamide, parts | 1 | 1 | — | — | 1 | — |
| 11-acetamidostearic acid, parts | — | — | 0.3 | — | — | 0.3 |
| Flame retardancy, seconds | 27 | 20 | 30 | More than 60 | More than 60 | More than 60 |

EXAMPLE 3

100 parts of a dimethylvinylsilyl endblocked polydiorganosiloxane having a degree of polymerization of about 3,500 and consisting of 96.5 mol % dimethylsiloxane units, 0.5 mol % methylvinylsiloxane units, and 3 mol % methylphenylsiloxane units; 5 parts of a hydroxyl endblocked polydimethylsiloxane having a degree of polymerization of 10, 4 parts of diphenylsilanediol and 55 parts of a fumed silica with a specific surface area of 200 m²/g were kneaded uniformly and then heat treated at 150° C. for 2 hours to obtain a base compound. After cooling the base compound, there was added to 100 parts of this base compound 0.8 part of 2,4-dichlorobenzoyl peroxide, 1.0 part of para-chlorobenzoyl peroxide and the components shown in Table III. The mixture was then mixed uniformly with a 2-roll mixer and the silicone rubber coated electrical line was prepared by vulcanizing as in Example 1. The results of the flame retardancy tests are shown in Table III.

TABLE III

| | This invention | | Comparative example | |
|---|---|---|---|---|
| Composition No. | 10 | 11 | 12 | 13 |
| Base compound, parts | 100 | 100 | 100 | 100 |
| H₂PtCl₆.6H₂O 2% isopropanol solution, parts | 0.2 | 0.2 | 0.2 | 0.2 |
| Ceric oxide, part | 3 | — | 3 | — |
| Ceric hydroxide, parts | — | 1.5 | — | 1.5 |
| N—methylacetamide, parts | 1.2 | — | — | — |
| N—ethylacetamide, parts | — | 1.2 | — | — |
| Flame retardancy, seconds | 20 | 17 | More than 60 | More than 60 |

That which is claimed is:

1. A flame retardant silicone rubber composition comprising (A) 100 parts by weight of a polydiorganosiloxane of the average unit formula

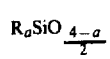

$$R_aSiO_{\frac{4-a}{2}}$$

in which each R is a monovalent radical selected from the group consisting of hydrocarbon radicals and halogenated hydrocarbon radicals and a has a value of from 1.95 to 2.05 inclusive, (B) 0 to 150 parts by weight of a fine particle silica filler, (C) 1 to 200 ppm by weight of platinum based on the weight of (A), in the form of platinum or a platinum-containing compound, (D) 0.01 to 5 parts by weight of carboxamide being formed from an acid selected from a monobasic acid, a multibasic acid, and a hydroxycarboxylic acid which acid is selected from carbonic acid, formic acid, aliphatic carboxylic acids, and aromatic carboxylic acids; which carboxamide is an amide which is a primary amide, a secondary amide, or a tertiary amide in which the amide contains alkyl, aryl, or hydrogen atoms bonded to nitrogen, and (E) 0.1 to 5 parts by weight of an organic peroxide.

2. The composition according to claim 1 further comprising (F) 0.1 to 10 parts by weight of cerium oxide or cerium hydroxide.

3. The composition according to claim 1 in which the polydiorganosiloxane of (A) is a gum, (B) is from 10 to 80 parts by weight of a fumed silica filler, (D) is present in an amount of from 0.1 to 5 parts by weight, and the organic peroxide of (E) is an acyl peroxide.

4. The composition according to claim 3 further comprising (F) 0.1 to 10 parts by weight of cerium oxide or cerium hydroxide.

5. The composition according to claim 3 in which the gum of (A) is a polydiorganosiloxane in which the organic radicals are methyl and vinyl radicals or methyl, vinyl, and phenyl radicals, the fumed silica filler is present in an amount of from 30 to 60 parts by weight, (C) is a platinum compound present in an amount sufficient to provide from 5 to 100 parts by weight of platinum per 1,000,000 parts by weight of (A), the carboxamide of (D) is present in an amount of from 0.2 to 3 parts by weight, and the acyl peroxide of (E) is present in an amount of from 0.5 to 3 parts by weight.

6. The composition according to claim 5 further comprising (F) 0.5 to 5 parts by weight of cerium oxide or cerium hydroxide.

7. The composition according to claim 5 in which the organic radicals of the gum are methyl and vinyl radicals.

8. The composition according to claim 5 in which the organic radicals of the gum are methyl, vinyl, and phenyl.

9. The composition according to claim 7 in which the carboxamide is N,N-dimethylformamide.

10. The composition according to claim 7 in which the carboxamide is 11-acetamidostearic acid.

11. The composition according to claim 8 in which the carboxamide is N-methylacetamide.

12. The composition according to claim 8 in which the carboxamide is N-ethylacetamide.

13. The composition according to claim 9 further comprising a hydroxyl endblocked polydimethylsiloxane fluid and diphenylsilanediol.

14. The composition according to claim 10 further comprising a hydroxyl endblocked polydimethylsiloxane fluid and diphenylsilanediol.

15. The composition according to claim 11 further comprising a hydroxyl endblocked polydimethylsiloxane fluid and diphenylsilanediol.

16. The composition according to claim 12 further comprising a hydroxyl endblocked polydimethylsiloxane fluid and diphenylsilanediol.

17. A method for preparing a flame retardant silicone rubber composition comprising (I) mixing (A) 100 parts by weight of a polydiorganosiloxane gum of the average unit formula $$R_a SiO_{\frac{4-a}{2}}$$

in which each R is a monovalent radical selected from the group consisting of hydrocarbon radicals and halogenated hydrocarbon radicals and a has a value of from 1.95 to 2.05 inclusive, (B) 5 to 150 parts by weight of a fine particle silica filler, and optionally a processing aid, to obtain a mixture, (II) heating the mixture obtained in (I) to a temperature of 50° to 250° C. for at least 10 minutes, (III) cooling the mixture, and thereafter (IV) admixing with the mixture (C) 1 to 200 parts by weight platinum per 1,000,000 parts by weight of (A)) or an amount of a platinum compound sufficient to provide from 1 to 200 parts by weight of platinum per 1,000,000 parts by weight of (A), (D) 0.01 to 5 parts by weight of a carboxamide being formed from an acid selected from a monobasic acid, a multibasic acid, and a hydroxycarboxylic acid which acid is selected from carbonic acid, formic acid, aliphatic carboxylic acids, and aromatic carboxylic acids; which carboxamide is an amide which is a primary amide, a secondary amide, or a tertiary amide in which the amide contains alkyl, aryl, or hydrogen atoms bonded to nitrogen, and (E) 0.15 to 5 parts by weight of an organic peroxide.

18. The method in accordance with claim 17 further comprising heating the resulting composition above the activation temperature of the organic peroxide and obtaining a flame retardant silicone rubber.

19. The method in accordance with claim 17 further comprising in (IV), (F) 0.1 to 10 parts by weight of cerium oxide or cerium hydroxide.

20. The method in accordance with claim 19 further comprising heating the resulting composition above the activation temperature of the organic peroxide and obtaining a flame retardant silicone rubber.

21. The flame retardant silicone rubber obtained from the method of claim 18.

22. The flame retardant silicone rubber obtained from the method of claim 20.

* * * * *